United States Patent
Kuperstein et al.

(10) Patent No.: US 9,110,658 B2
(45) Date of Patent: Aug. 18, 2015

(54) AUTOMATIC VERIFICATION AND SYNTHESIS FOR WEAK MEMORY MODELS

(75) Inventors: Michael Kuperstein, Rishon le Tzion (IL); Martin Vechev, Yorktown Heights, NY (US); Eran Yahav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 13/097,432

(22) Filed: Apr. 29, 2011

(65) Prior Publication Data

US 2012/0278792 A1 Nov. 1, 2012

(51) Int. Cl.
*G06F 9/44* (2006.01)
*G06F 11/36* (2006.01)

(52) U.S. Cl.
CPC .......... *G06F 8/314* (2013.01); *G06F 11/3604* (2013.01)

(58) Field of Classification Search
CPC ........................................................ G06F 9/44
USPC ........................................ 717/104, 105, 144
See application file for complete search history.

(56) References Cited

U.S. PATENT DOCUMENTS

| | | | | |
|---|---|---|---|---|
| 5,289,588 | A * | 2/1994 | Song et al. | 711/120 |
| 5,751,986 | A * | 5/1998 | Fetterman et al. | 712/218 |
| 6,101,576 | A * | 8/2000 | Kobayashi et al. | 711/122 |
| 6,175,902 | B1 * | 1/2001 | Runaldue et al. | 711/159 |
| 7,475,397 | B1 * | 1/2009 | Garthwaite et al. | 718/101 |
| 7,702,743 | B1 * | 4/2010 | Wong | 709/216 |
| 7,779,393 | B1 * | 8/2010 | Manovit et al. | 717/132 |
| 2004/0230750 | A1 * | 11/2004 | Blake et al. | 711/146 |
| 2005/0138195 | A1 * | 6/2005 | Bono | 709/231 |
| 2006/0212656 | A1 * | 9/2006 | Ueki et al. | 711/131 |
| 2007/0214321 | A1 * | 9/2007 | Shannon et al. | 711/122 |
| 2008/0288834 | A1 * | 11/2008 | Manovit et al. | 714/718 |

OTHER PUBLICATIONS

Atig ("On the Verification Problem for Weak Memory Models"), Jan. 17-23, 2010.*
Guerraoui ("Model Checking Transactional Memories"), 2008.*
Arvind ("Memory Model=Instruction Reordering + Store Atomaicity"), 2006.*
Koopman ("19 Multiprocessor Consistency and Coherence"), Nov. 18, 1998.*
Burckhardt ("Memory Model Safety of Programs"), Jul. 2008.*
Adve et al., "Shared memory consistency models: A tutorial", IEEE Computer 29, pp. 66-76 (1995).

(Continued)

*Primary Examiner* — Chat Do
*Assistant Examiner* — Jae Jeon
(74) *Attorney, Agent, or Firm* — Ryan, Mason & Lewis, LLP

(57) ABSTRACT

Techniques are provided for automatic verification and inference of memory fences in concurrent programs that can bound the store buffers that are used to model relaxed memory models. A method is provided for determining whether a program employing a relaxed memory model satisfies a safety specification. An abstract memory model is obtained of the relaxed memory model. The abstract memory model represents concrete program states of the program as a finite number of abstract states. The safety specification is evaluated for the program on the abstract memory model having the finite number of abstract states. Fence positions at one or more locations can be determined to ensure that the safety specification is satisfied.

17 Claims, 10 Drawing Sheets

(56) References Cited

OTHER PUBLICATIONS

Atig et al., "On the Verification Problem for Weak Memory Models", POPL pp. 7-18 (2010).
Boigelot et al., "The Power of QDDs", In SAS, Springer p. 172-186 (1997).
Burkhardt et al., "Check-Fence: Checking Consistency in Relaxed Memory Models", PLDI p. 12-21 (2007).
Burkhardt et al., "Effective Program Verification for Relaxed Memory Models," CAV, p. 107-120 (2008).
Burnim et al., "Sound and Complete Monitoring of Sequential Consistency in Relaxed Memory Models", Tech. Rep. UCB/EECS (2010).
Burnim et al., Testing COncurrent Programs on Relaxed Memory Models. Tech. Rep. UCB/EECS-2010-32.
Clarke et al, "Design an Synthesis of Synchronization Skeletons Using Branching-Time Temporal Logic", In Logic of Programs, Workshop p. 52-71 (1982).
Cousot et al., Abstract Interpretation: A Unified Lattice Model for Static Analysis of Programs by Construction of Approximation of Fixed Points:, POPL p. 238-252 (1977).
Dijkstra, E., "Cooperating Sequential Process", TR EWD-123. Tech rep. Technological University, Eindhoven (1965).
Fang et al., "Automatic Fence Insertion for Shared Memory MultiProcessing", ICS p. 285-294 (2003).
Gall et al., Verification of communication protocols using abstract interpretation of FIFO queues, AMAST p. 204-219 (2006).
Huynh et al., "A Memory Model Snesitive Bytecode Verification", Form. Methods Syst. Des. 31, 3 (2007).
Jonsson, B., "State-Space Exploration for Concurrent Algorithms Under Weak Memory orderings: (preliminary search)", SIGARCH Comput. Archit. News 36, 5 p. 65-71 (2008).
Kuperstein et al., "Automatic Inferrence of Memory Fences", FMCAD (2010).
Lamport, L. "A New Solution of Dijkstra's Concurrent Programming Problem", Commun. ACP 17, 8 p. 453-455 (1974).
Lamport, L., "How to Make a Multiprocessor Computer that Correctly Executes Multiprocess Program", IEEE Trans. Comput. 28, 9, p. 690-691 (1979).
Lamport, L., "A Fast Mutual Exclusion Algorithm", ACM Trans. Comput. Syst, f, 1, p. 1-11 (1987).
Lee et al., "Hiding Relaxed Memory Consistency with a Computer", IEEE Trans. Comput. 50, 8, p, 824-833 (2001).
Linden et al., "An Automata-based Symbolic Approach for Verifying Programs on Relaxed Memory Models", SPIN, p. 212-226 (2010).
Mador-Haim et al., "Generating Litmus Tests for Contrasting Memory Consistency Models", CAV, p. 273-287 (2010).
Mador-Haim et al., "Plug and Play Components for the Exploration of Memory Consistency Models", Tech. Rep. MS-CIS-10-02, University of Penn. (2010).
Magnusson et al., "Queue Locks on Cache Coherent Multiprocessors", In Proceedings of the Int. Symp. on Parallel Processing, IEEE p. 165-171 (1994).
Mellor-Crummey et al., Algorithms for Scalable Synchronization on Shared-Memory Multiprocessrs. ACM Trans. Comput. Syst. 9, 1 p. 21-65 (1991).
Owens, S., "Reasoning About the Implementation of Concurrency Abstractions on x86-TSO", ECOOP (2010).
Owens et al., "A Better x86 Memory Model: x86-TSO", TPHOLs, p. 391-407 (2009).
Park et al., "An Executable Specification and Verifier for Relazed Memory Order", IEEE Trans. on Computers 48 (1999).
Peterson, G. L., "Myths About the Mutual Exclusion Problem", Inf. Process. Lett. 12. 3, p. 115-116 (1981).
Saraswat et al., "A Theory of Memory Models", PPoPP, ACM p. 161-172 (2007).
Shasha et al., "Efficient and Correct Execution of Parallel Programs that Share Memory", ACM Trans. Program Lang. Syst, 10, 2 p. 282-312 (1988).
Shen et al., Commit-reconcile & Fences (CRF): a New Memory Model for Architects and Compiler Writers. SIGARCH Comput. Archit. News 27, 2, p. 150-161 (1999).
Sparc International, I., The SPARCH architecture manual (version 9). Prentice-Hall, Inc., Upper Saddle River, NJ, USA (1994).
Vechev et al., "Deriving Linearizable Fine-Grained Concurrent Objects", PLDA, p. 125-135 (2008).
Vechev et al., "Abstraction-guided Synthesis of Synchronization", POPL (2010).
Vechev et al., Cgcexplorer: A Semi-automated Search Procedure for Provably Correct Concurrent Collectors. PLDI, p. 456-467 (2007).
Vechev et al., "Inferring Synchronization Under Limited Observability", TACAS, p. 139-154 (2009).
Yang et al., "Umm: An Operational Memory Model Specification Framework with Integrated Model Checking Capability", Concurr. Comput.: Pract. Exper. 17, 5-6, p. 465-487 (2005).

* cited by examiner

FIG. 1

| PROCESS 0: | PROCESS 1: |
|---|---|
| 1  while (true) | 1  while (true) |
| 2  { | 2  { |
| 3    store ent0 = true; | 3    store ent1 = true; |
| 4    <u>fence;</u> | 4    <u>fence;</u> |
| 5    store turn = 1; | 5    store turn = 0; |
| 6    <u>fence;</u> | 6    <u>fence;</u> |
| 7    do | 7    do |
| 8    { | 8    { |
| 9      load e = ent1; | 9      load e = ent0; |
| 10     load t = turn; | 10     load t = turn; |
| 11   } | 11   } |
| 12   while (e == true && t == 1); | 12   while (e == true && t == 0); |
| 13   //Critical Section here | 13   //Critical Section here |
| 14   store ent0 = false; | 14   store ent1 = false; |
| 15 } | 15 } |

FIG. 4

Semantics 1 Operational semantics defining transition from $\langle G, L, pc, B \rangle$ to $\langle G', L', pc', B' \rangle$ under PSO.

$$\frac{stmt(pc(p)) = load\ x, r \quad B(p)(x) = \epsilon \quad G(x) = v}{L'(p)(r) = v \quad pc'(p) = next(pc(p))} \text{ (LOAD-G)}$$

$$\frac{stmt(pc(p)) = load\ x, r \quad B(p)(x) = b \bullet v}{L'(p)(r) = v \quad pc'(p) = next(pc(p))} \text{ (LOAD-B)}$$

$$\frac{stmt(pc(p)) = store\ r, x \quad B(p)(x) = b \quad L(p)(r) = v}{B'(p)(x) = b \bullet v \quad pc'(p) = next(pc(p))} \text{ (STORE)}$$

$$\frac{B(p)(x) = v \bullet b}{B'(p)(x) = b \quad G'(x) = v} \text{ (FLUSH)}$$

$$\frac{stmt(pc(p)) = fence \quad \forall x \in Shared.B(p)(x) = \epsilon}{pc'(p) = next(pc(p))} \text{ (FENCE)}$$

$$\frac{stmt(pc(p)) = cas\ x, r, s, q}{G(x) = L(p)(r) \quad L(p)(s) = v \quad B(p)(x) = \epsilon}{G'(x) = v \quad L'(p)(q) = true \quad pc'(p) = next(pc(p))} \text{ (CAS-T)}$$

$$\frac{stmt(pc(p)) = cas\ x, r, s, q \quad G(x) \neq L(p)(r) \quad B(p)(x) = \epsilon}{L'(p)(q) = false \quad pc'(p) = next(pc(p))} \text{ (CAS-F)}$$

FIG. 5

Semantics 2 LOAD-G rule for concrete TSO $$\frac{stmt(pc(p)) = load\ x, r \quad \forall(y, d) \in B(p), y \neq x \quad G(x) = v}{L'(p)(r) = v \quad pc'(p) = next(pc(p))} \text{ (LOAD-G)}$$

FIG. 6

Semantics 3 Abstract operational semantics defining transition from $\langle G, L, pc, l, S, H \rangle$ to $\langle G', L', pc', l', S', H' \rangle$ $$\frac{st(pc) = load\ x, r \quad emp(p)(x) \quad v = G(x)}{L'(r) = v \quad pc' = next(pc)} \text{ (LOAD-G)}$$

$$\frac{st(pc) = load\ x, r \quad \neg emp(p)(x) \quad v = l(x)}{L'(r) = v \quad pc'(p) = next(pc)} \text{ (LOAD-B)}$$

$$\frac{st(pc) = store\ r, x \quad S(x) = \emptyset \quad H(x) = h \quad |h| < k \quad L(r) = v}{H'(x) = h \bullet v \quad l'(x) = v \quad pc' = next(pc)} \text{ (STORE-H)}$$

$$\frac{st(pc) = store\ r, x \quad S(x) = s \quad s \neq \emptyset \vee |H(x)| = k \quad L(r) = v}{S'(x) = s \cup \{v\} \quad l'(x) = v \quad pc' = next(pc)} \text{ (STORE-S)}$$

$$\frac{H(x) = v \bullet h}{H'(x) = h \quad G'(x) = v} \text{ (FLUSH-H)}$$

$$\frac{H(x) = \varepsilon \quad v \in S(x)}{G'(x) = v} \text{ (FLUSH-SN)}$$

$$\frac{H(x) = \varepsilon \quad v \in S(x) \quad \neg(v = l(x) \wedge S(x) \neq \{v\})}{G'(x) = v \quad S'(x) = S(x) \setminus v} \text{ (FLUSH-SD)}$$

$$\frac{st(pc) = fence \quad \forall x. emp(p)(x)}{pc' = next(pc)} \text{ (FENCE)}$$

$$\frac{st(pc) = cas\ x, r, s, q \quad emp(p)(x) \quad L(r) = G(x) \quad L(s) = v}{G'(x) = v \quad L'(q) = T \quad pc' = next(pc)} \text{ (CAS-T)}$$

$$\frac{st(pc) = cas\ x, r, s, q \quad emp(p)(x) \quad L(r) \neq G(x)}{L'(q) = F \quad pc' = next(pc)} \text{ (CAS-F)}$$

FIG. 7

Semantics 4 Partially-disjunctive flush semantics $$\frac{H(x) = \varepsilon \quad v \in S(x)}{G'(x) = v} \text{ (FLUSH-NE)}$$

$$\frac{H(x) = \varepsilon \quad S(x) \neq \emptyset}{G'(x) = l(x) \quad S'(x) = \emptyset} \text{ (FLUSH-E)}$$

FIG. 8

| PROCESS 1: | PROCESS 2: |
|---|---|
| 1  store x = 1; | 1  load r1 = x; |
| 2  store x = 2; | 2  load r2 = x; |

| PROGRAM | SET | | $FD_{k=0}$ | | $FD_{k=1}$ | |
|---|---|---|---|---|---|---|
| Sense1 | ✓ | 0.6 | ✓ | 1.7 | ✓ | 0.8 |
| Pet2 | ✗ | 7.7 | ✓ | 2.4 | ✓ | 1.8 |
| Dek2 | ✗ | 9.7 | ✓ | 4.5 | ✓ | 3.1 |
| Lam2 | ✗ | 41.2 | ✓ | 22.2 | ✓ | 9 |
| Fast3 | ✗ | 22.2 | ✗ | 16.4 | ✓ | 11.1 |
| CLH2 | ✗ | - | ✗ | - | ✓ | 68.8 |
| MCS0 | ✓ | 144.3 | ✓ | 147.7 | ✓ | 36.4 |

FIG. 10

```
1   while (true)
2   {
3     start:
4     store b[i] = true;
5     store x = i;
6     load local_y = y;
7     if (local_y ≠ 0) {
8       store b[i] = false;
9       while (local_y ≠ 0)
10        load local_y = y;
11      goto start;
12    }
13    store y = i;
14    load local_x = x;
15    if (x ≠ i) {
16      store b[1] = false;
17      do {
18        load other_b = b[3 - i];
19      } while (other_b ≠ 0);
20      load local_y = y;
21      if (local_y ≠ i)
22      {
23        while (local_y ≠ 0)
24          load local_y = y;
25        goto start;
26      }
27    }
28    //Critical Section here
29    store y = 0;
30    store b[i] = false;
31  }
```

FIG. 11

| PROGRAM | $FD_{k=0}$ | | $FD_{k=1}$ | | $PD_{k=0}$ | | $PD_{k=1}$ | | $PD_{k=2}$ | |
|---|---|---|---|---|---|---|---|---|---|---|
| Sense0 | ✓ | 57.6 | ✓ | 58.6 | ✓ | 31.9 | ✓ | 44.3 | ✓ | 6.1 |
| Pet0 | ✓ | 69.2 | ✓ | 524.5 | ✓ | 25.3 | ✓ | 244.7 | ✓ | 1124.2 |
| Dek0 | ✓ | 424.2 | ✓ | 3238.1 | ✓ | 16.5 | ✓ | 358.1 | ✓ | 2350.0 |
| Lam0 | ✗ | - | ✗ | - | ✓ | 421.0 | ✓ | 4045.9 | ✗ | - |
| Fast0 | ✗ | - | ✗ | - | ✓ | 220.6 | ✗ | - | ✗ | - |
| Fast1a | ✓ | 139.0 | ✓ | 105.2 | ✓ | 33.0 | ✓ | 88.1 | ✓ | 41.9 |
| Fast1b | ✓ | 832.9 | ✓ | 972.3 | ✓ | 78.6 | ✓ | 501.6 | ✓ | 878.4 |
| Fast1c | ✗ | - | ✗ | - | ✓ | 110.4 | ✓ | 1173.4 | ✓ | 1858.1 |

AUTOMATIC VERIFICATION AND SYNTHESIS FOR WEAK MEMORY MODELS

FIELD OF THE INVENTION

The present invention relates generally to techniques for placing memory fences in a concurrent program running on a relaxed memory model, and more particularly, to methods and apparatus for automatic verification and inference of memory fences in concurrent programs running under such relaxed memory models.

BACKGROUND OF THE INVENTION

Modern architectures often use relaxed memory models in which memory operations may be reordered and executed non-atomically. While these models allow improved hardware performance, they pose an additional burden on the programmer, who is forced to reason about non-sequentially consistent program executions. To allow programmer control over these relaxed executions, processors provide special memory fence instructions.

As multi-core processors become increasingly dominant, highly concurrent algorithms emerge as critical components of many existing systems. Highly-concurrent algorithms are often hard to get right and often rely on subtle ordering of events, an ordering that may be violated under relaxed memory models.

Finding a correct and efficient placement of memory fences for a concurrent program is a challenging task. Using too many fences (over-fencing) hinders performance, while using too few fences (under-fencing) permits executions that violate correctness.

Even for finite-state programs, fence verification under relaxed memory models is a hard problem. Given a finite state program and a safety specification, verifying that the program satisfies the specification under a sufficiently relaxed memory model (such as a SPARC RMO memory model. See, e.g., SPARC International, Inc., "C. The SPARC Architecture Manual," (Ver. 9), Prentice-Hall, Inc., 1994) is undecidable. For somewhat stronger memory models (such as SPARC "Total Store Order" (TSO) and "Partial Store Order" (PSO)), the problem is decidable but has non-primitive recursive complexity.

Relaxed memory models allow two basic relaxations of sequential consistency: memory operations may be reordered with respect to each other, and stores may be executed non-atomically across processors. Some relaxations can be naturally modeled using store buffers, emulating the actual hardware implementation.

The basic hurdle for automatic verification using those models is that store buffers can grow without a bound, even for programs that are otherwise finite state. To enable automatic program verification on relaxed memory models, a need exists for techniques for automatic verification and inference of memory fences in concurrent programs that can bound these store buffers.

While a number of techniques have been proposed or suggested for automatic verification and inference of memory fences in concurrent programs, they suffer from a number of limitations, which if overcome, could further improve the reliability of the verification and inference of memory fences. For example, a number of existing approaches employ either under-approximations such as bounded checking and testing, or side-step the problem by focusing on a restricted class of programs. For example, V. A. Saraswat et al., "A Theory of Memory Models," *PPoPP*, ACM, 161-172 (2007) considers data-race free programs, and S. Owens, "Reasoning About the Implementation of Concurrency Abstractions on x86-TSO," *ECOOP* (2010) focuses on programs free from a particular type of data races.

SUMMARY OF THE INVENTION

Generally, techniques are provided for automatic verification and inference of memory fences in concurrent programs that can bound the store buffers that are used to model relaxed memory models. According to one aspect of the invention, a method is provided for determining whether a program employing a relaxed memory model satisfies a safety specification. An abstract memory model is obtained of the relaxed memory model. The abstract memory model represents concrete program states of the program as a finite number of abstract states. The safety specification is evaluated for the program on the abstract memory model having the finite number of abstract states.

The relaxed memory model uses store buffers that are represented in the abstract memory model in a bounded way by not recording order information between items in a corresponding store buffer beyond a predefined bound. A most recently stored value can be recorded for the store buffers, such that when several values are stored to a shared variable, and then a load from the shared variable is performed, only a most recent value that was stored is obtained. An order between an oldest k elements can be maintained in a given store buffer, such that a first process $p_i$ should not observe values written by a second process $p_j$ in an order different from the order in which they were written by the second process $p_j$. The store buffers can model a reordering of memory operations with respect to each other. The store buffers model executing one or more store operations non-atomically across a plurality of processors.

According to further aspects of the invention, the abstract memory model (i) at least partially preserves information required for memory coherence and consistency; (ii) preserves intra-process coherence by maintaining recency information per variable; and (iii) preserves inter-process coherence by preserving an order between write operations up to a constant bound and handling write operations beyond the constant bound as an unordered set. The constant bound may optionally be programmed by a user.

Another aspect of the invention determines fence positions at one or more locations to ensure that the safety specification is satisfied. The fence locations ensure that if a process $p_i$ performs a fence when its buffer for variable x is non-empty, a value of x visible to one or more additional processes immediately after the fence location, is a most recent value written by the process $p_i$.

A more complete understanding of the present invention, as well as further features and advantages of the present invention, will be obtained by reference to the following detailed description and drawings.

BRIEF DESCRIPTION OF THE DRAWINGS

FIG. 1 illustrates exemplary pseudo code for the well-known Peterson's mutual exclusion algorithm with fences that guarantee mutual exclusion under a PSO memory model;

FIG. 4 illustrates operational semantics (Semantics 1) defining transitions under the PSO memory model;

FIG. 5 illustrates operational semantics (Semantics 2) defining a LOAD—G rule for a concrete TSO memory model;

FIG. 6 illustrates abstract operational semantics (Semantics 3) defining transitions from (G, L, pc, l, S, H) to (G', L', pc', l', S', H');

FIG. 7 illustrates partially disjunctive flush semantics (Semantics 4);

FIG. 8 illustrates an exemplary fully disjunctive partial-coherence abstraction with k=0 leads to a redundant fence between the stores in Process 1, while with k=1 the inference algorithm determines that no fences are necessary;

FIG. 9 is a sample table illustrating verification results and number of states produced by an exemplary embodiment with various abstractions;

FIG. 10 illustrates exemplary pseudo code 000 for a version of Lamport's fast mutex algorithm for two processors;

FIG. 11 is a sample table illustrating the state-space size and inference results for five of the under-fenced implementations.

DETAILED DESCRIPTION OF PREFERRED EMBODIMENTS

Figure 2:
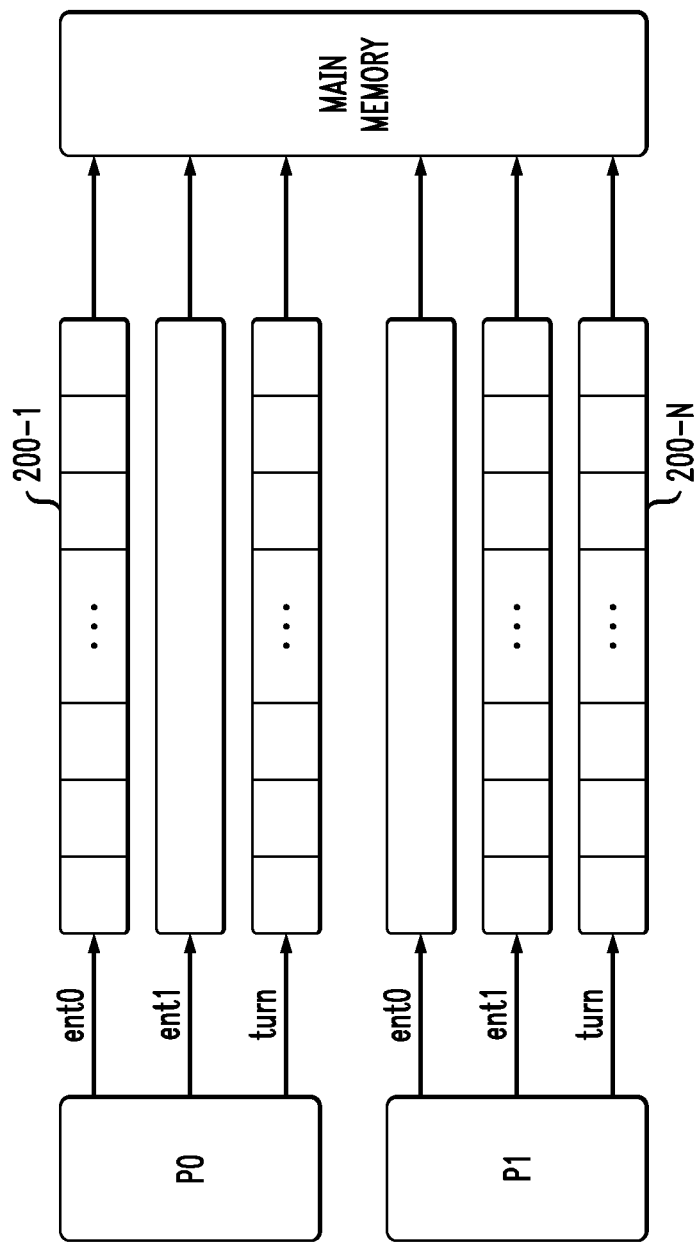
FIG. 2 illustrates store buffers for the Peterson algorithm of FIG. 1 under the PSO memory model.

The present invention provides methods and apparatus for automatic verification and inference of memory fences in concurrent programs running on relaxed memory models that can bound the above-described store buffers. According to one aspect of the invention, a family of partial-coherence abstractions is provided for store buffers. The disclosed abstractions provide a bounded representation for (potentially) unbounded store buffers. As used herein, the term abstract memory models refer to memory models that use an abstract structure to represent store buffers. A range of abstractions is provided with varying precision, enabling successive abstraction refinements of a given abstract memory model MA.

Given a program P, a specification S and an abstract memory model MA, it is desired to know whether $P|=m_AS$, that is, whether the program satisfies the specification under the given abstract memory model. When $PV|\neq m_AS$, it is possible to:

Refine the abstraction: refine $M_A$ and try to find a more precise memory model $M_{A'}$ under which $P|=m_{A'}S$.

Restrict the program: find a program P' obtained from P by adding memory fences that restrict the permitted re-orderings during execution, such that $P'|=m_AS$.

Aspects of the present invention restrict the program by inserting fences. As discussed hereinafter, different abstract memory models will affect the precision of the resulting fence placement. In the exemplary embodiment, a family of abstractions are considered for the TSO and PSO memory models, as those models are implemented in common hardware (e.g., Intel x86 and SPARC) and have concrete operational semantics.

Partial-Coherence Abstractions

The challenge for abstractions of store buffers is to provide a bounded representation that (partially) preserves the following three key properties, discussed further below:

Intra-Process Memory Coherence: a process should only see its own most recently written value to a variable.

Inter-Process Memory Coherence: a process should observe values written by another process in the order they were written.

Fence Semantics: a fence executed by a process writes to memory the most recent value written by the process.

Generally, the disclosed abstractions preserve only a limited amount of order inherent in a store buffer. In particular, the disclosed abstract buffer representation preserves information about: i) the most recent store to a buffer, and ii) the order between a bounded number of stores on the head of the buffer. While inter-process coherence is only partially preserved, this choice is effective for verifying concurrent algorithms running on relaxed memory models, as discussed further below in the section entitled "Partial-Coherence Abstractions."

According to a further aspect of the invention, a family of parametric abstractions is provided that enable automatic verification of safety properties for programs under relaxed memory models. An additional aspect of the invention automatically infers a correct fence placement that is optimal under the given abstraction, when a program violates its specification but can be fixed by only adding fences. The present invention recognizes an interplay between refining the abstraction and restricting the program. In particular, finer abstractions lead to successful verification with fewer fences, while restricting the program by adding fences enables verification with a coarser abstraction.

Overview

Motivating Example

Peterson's Algorithm

FIG. 1 illustrates exemplary pseudo code for the well-known Peterson's mutual exclusion algorithm 100 with fences that guarantee mutual exclusion under the PSO memory model. In the algorithm 100, two processes 0 and 1 repeatedly enter and exit the critical section. For the exemplary algorithm 100, it should satisfy the mutual exclusion property: it is impossible for both processes to be in the critical section simultaneously. Indeed, Peterson's algorithm 100 satisfies mutual exclusion under a sequentially-consistent (SC) memory model. Unfortunately, under relaxed memory models, such as "Partial Store Order" (PSO), the algorithm 100 does not satisfy the property.

Generally, the PSO Memory Model is one of three memory consistency models implemented by the SPARC architecture (see, e.g., SPARC International, "The SPARC Architecture Manual (Ver. 9). Prentice-Hall, Inc., Upper Saddle River, N.J., USA, 1994). In PSO, a write to some memory locations may become visible to other processes only after the writing process executes, later reads and writes to different memory locations.

The PSO model can be formalized operationally by associating with each processor a set of FIFO queues (store buffers), one for each variable, as shown in FIG. 2. FIG. 2 illustrates the store buffers 200-1 through 200-N (collectively, store buffers 200) for the Peterson algorithm 100 of FIG. 1 under the PSO memory model. Note that buffers 200 can grow without a bound.

The informal semantics of store buffers 200 for PSO can be summarized as follows:

Store buffering: A write issued by process p, to variable x is written into the store buffer associated with (p, .x).

Store forwarding: A read by $P_j$ from y is satisfied from its local store buffer (associated with (ps, y)) if it is not empty, or from the global memory otherwise.

Flushing: The oldest value stored in the buffer may be written to the global memory and removed from the buffer at non-deterministic points in the execution.

Under the PSO model, the following "delayed write" execution of Peterson's algorithm 100 is possible:

$p_o$ runs alone until line 13, however the store to ent0 in line 3 is written only to the buffer and never flushed.

$p_1$ runs. Since the store to ent0 is delayed, it is not visible to $p_1$. $p_1$ enters the critical section, and mutual exclusion is violated.

Peterson's algorithm 100 relies on ordering of reads and writes for synchronization. It requires $p_o$'s write to ent0 to be visible to $p_1$, before $p_o$ reads ent1, and symmetrically on $p_1$'s write to ent1 to be visible to $p_o$ before $p_1$ reads ent0. When the underlying memory model does not preserve this order, Peterson's algorithm 100, as shown in FIG. 1, does not satisfy mutual exclusion.

To allow programmer control over ordering in relaxed memory models, processors provide special memory fence instructions. Intuitively, the semantics of a fence are that memory operations issued before the fence must take global effect before memory operations after the fence execute. In general, there are different kinds of fences (e.g., store-load, store-store) that impose order between different types of operations. A store-load fence executed by a processor forces all stores issued by that processor to complete before any new loads by the same processor start. It is assumed that the model provides the strongest type of fence (i.e., a "full memory barrier") that restricts any reordering of memory operations. In the motivating example, the fences in lines 4 and 6 prevent the erroneous execution above (and other possible related bugs) by forcing the stores in lines 3 and 5 to take global effect before the writing process can advance. Unfortunately, fence instructions are very costly in terms of CPU cycles. Thus, it is desired to place fences only when they are required for correctness.

The programmer's challenge is, then, in finding a fence placement that permits as much re-ordering as possible but does not allow the specification to be violated. To find an efficient placement of fences, reorderings that lead to violation of the specification must be observed, and find a minimal placement (often, there are multiple non-comparable solutions) that prevents these re-orderings. When the program is finite-state, all reachable program states can be enumerated, error states can be identified and fences can be found that prevent execution from reaching those States (c.f., M. Kuperstein et al., "Automatic Inference of Memory Fences," *FMCAD* (2010)). Unfortunately, Peterson's algorithm 100 running on PSO has an infinite state-space. It is easy to see the length of the store buffers 200 generated by the program 100 is not bounded: running $p_o$ alone for t iterations of the outer loop without flushing will generate a buffer of length 2t for the ent0 variable.

Abstraction

To handle programs that have an unbounded state-space, a family of parametric abstractions are introduced that provide a conservative bounded representation. The disclosed abstractions induce a hierarchy of (abstract) memory models with varying degrees of consistency. Before describing the abstraction, it is noted that concrete PSO semantics must preserve the following properties:

1. Intra-Process Coherence: If a process stores several values to shared variable x, and then performs a load from x, it should not see any value it has itself stored except the most recent one.
2. Inter-Process Coherence: A process $p_i$, should not observe values written to variable x by process $p_j$ in an order different from the order in which they were written.
3. Fence Semantics: If a process $p_i$ performs a fence when its buffer for variable x is non-empty, the value of x visible to other processes immediately after the fence should be the most recent value $p_i$ wrote.

The above properties are phrased in terms of PSO semantics (store buffer per variable), but they can be extended to formulate similar properties for other memory models, as would be apparent to a person of ordinary skill in the art. For example, for a TSO memory model, inter-process coherence would be global and not per variable. See, S. Mador-Haim et al., "Generating Litmus Tests for Contrasting Memory Consistency Models," *CAV* 273-287 (2010).

The challenge in designing an abstraction for store-buffer based memory models lies in preserving as much of properties 1-3 as possible using a finite representation of the buffer 200. To preserve intra-process coherence, the disclosed abstractions maintain recency information per variable. To preserve inter-process coherence, the disclosed abstractions preserve order between writes up to some constant bound (a parameter of the disclosed abstraction), and treat the remaining writes as an unordered set. While property 2 is not fully conserved, this "partial coherence" abstraction is often sufficient in practice. The intuition is that if a process writes many (possibly different) values to the same shared variable without an intervening fence, the order in which they become visible is not important to the correctness of the algorithm.

Figure 3:
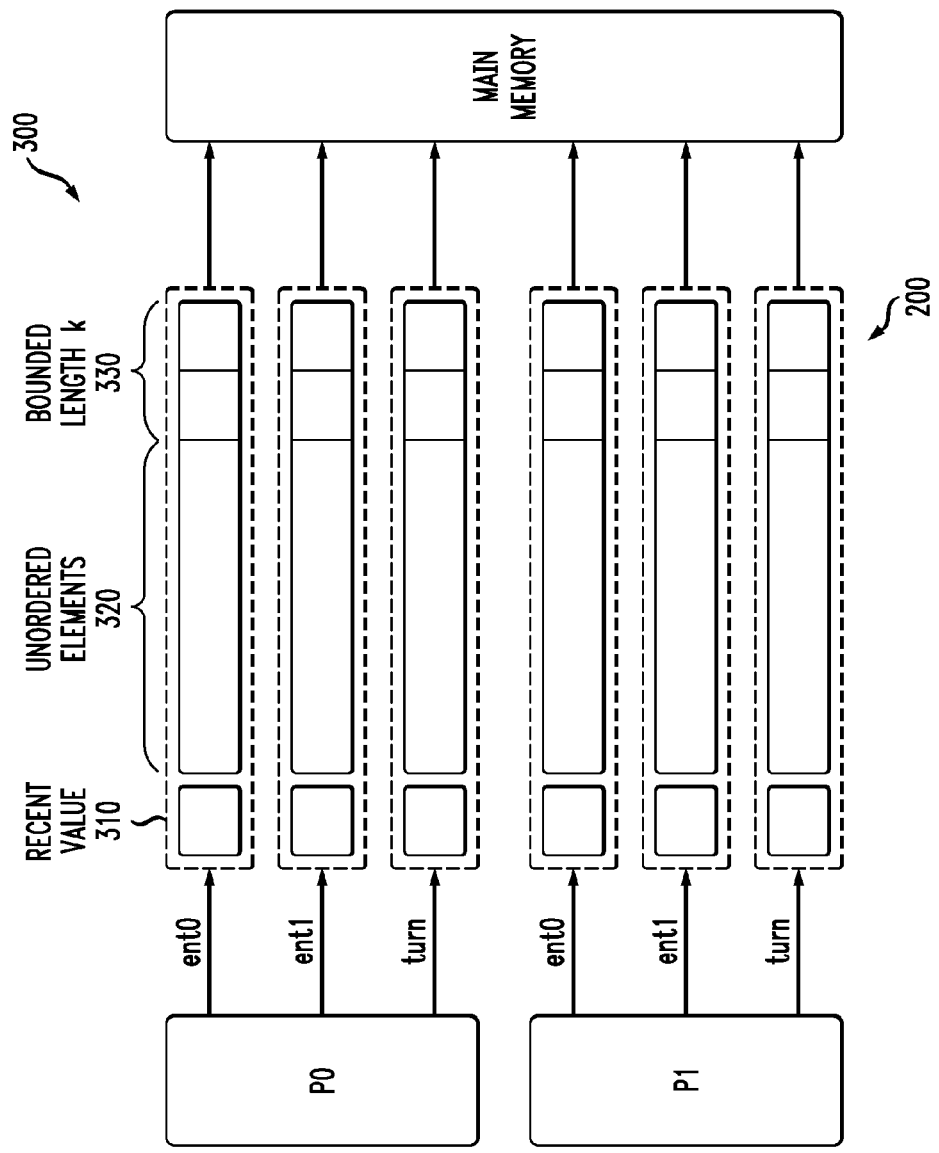
FIG. 3 shows a schematic view of a partial-coherence abstraction of the PSO store buffers of FIG. 2 for the Peterson algorithm of FIG. 1.

FIG. 3 shows a schematic view of a partial-coherence abstraction 300 of PSO store buffers 200 for the Peterson algorithm 100 of FIG. 1. In the partial-coherence abstraction 300 of FIG. 3, a store buffer 200 is represented by treating items 320 after a bounded head 330 (of length k) of the buffer 200 as a set, and additionally recording the most recently stored value 310 for each buffer 200.

A formal concrete semantics for the PSO memory model is presented in the section entitled "Operational Semantics for Relaxed Memory Models." The disclosed abstract semantics are presented in the section entitled "Partial-Coherence Abstractions." Using this abstraction with the fence inference algorithm described in the section entitled "fence inference," the disclosed approach automatically infers the fences shown in FIG. 1. It is shown that different parameters can be used to achieve more scalable abstractions and still get reasonable results. It is also shown that there is a tradeoff between the precision of the abstraction, and the optimality of the inferred fences. Finer abstractions lead to successful inference with fewer fences, while restricting the program by adding fences enables verification with a coarser abstraction. In particular, the disclosed partially disjunctive abstraction (see section entitled "Partially Disjunctive Abstraction for Store Buffers") produces non-trivial fence placements for programs for which full state spaces using the fully disjunctive abstraction could not be generated.

Operational Semantics for Relaxed Memory Models

Sequence Notation—Given a domain D, $Seq_n(D)$ denotes the set of all sequences of length n over D; $Seq_{\leq n}(D)$ denotes the set of all sequences shorter than or equal in length to n over D; Seq(D) denotes the set of all finite sequences over D, |w| denotes the length of a sequence w and $\epsilon$ denotes an empty sequence. The concatenation of two sequences $w_1$, $w_2$ is denoted by $w_1 \cdot w_2$. last(w) denotes the last element of a sequence w, head(w, k) denotes the subsequence consisting of the first k items in w, tail (w, k) the subsequence consisting of the last k items in w and Set(w) denotes the set of elements in w.

Program Syntax—Programs written in an exemplary programming language are considered with the operations load, store, branch, CAS (compare and swap) and sequential and parallel composition. The exemplary programs also contain a full fence operation. It is assumed that statements in the exemplary programs are labeled, and the labels used in the code of process are unique. The set of program labels are denoted by Labs.

Semantics—A transition system $TS_M$ for a program P under a memory model M is a tuple $\langle \Sigma, T \rangle$, where $\Sigma$ is a set of states, T is a set of transitions $\sigma \to \Sigma'$. A transition is in T if $\sigma$, $\sigma' \in \Sigma$, such that executing some statement from $\sigma$ according to the semantics of M results in state $\sigma'$. The semantics are presented in a standard operational style as a set of inference rules. To simplify presentation, when updating mappings, $M'(x)=v$ is used as a shorthand for $M'=M[\mapsto v]$. Components not updated in the inference rule are assumed to be left unchanged.

Store Buffers

The employed memory model semantics follow M. Atig et al., "On the Verification Problem for Weak Memory Models," POPL 7-18 (2010); J. Burnim et al., "Sound and Complete Monitoring of Sequential Consistency in Relaxed Memory Models," Tech. Rep. UCB/EECS-2010-31; and S. Mador-Haim et al., "Plug and Play Components for the Exploration of Memory Consistency Models," Tech. Rep. MS-CIS-10-02, University of Pennsylvania, 2010 and assume that processes execute their programs sequentially, and any violations of sequential consistency happen within the memory subsystem. This is in contrast to other formulations that combine the memory and processor effects The exemplary formulation is based on store-buffers 200, and the concrete semantics use the following semantic domains:

$G^{\mp} \in SVar$ where $SVar=Shared \to D$. Valuation of shared variables.

$L^{\mp} \in Env$ where $Env=PID \to (Local \to D)$. Valuation of local variables for each process.

$pc^{\mp} \in PC$ where $PC=PID \to labs$. Program counters.

$B^{\mp} \in SB$ where SB differs between different memory models, and is intentionally left unspecified at this stage. A representation of the store buffers.

A state $\sigma = \langle G_\sigma^{\mp}, L_\sigma^{\mp}, pc_\sigma^{\mp}, B_\sigma^{\mp} \rangle \in C^{\mp}$ is a tuple where $C^{\mp} = SVar \times Env \times PC \times SB$. next(pc) means the statement following pc(p) in the program code.

Partial Store Order (PSO) Model

Concrete Semantics—For PSO, a separate store buffer is maintained for every (process, variable) pair, that is $SB=PID \to (Shared \to Seq(D))$.

FIG. 4 illustrates the operational semantics 400 (Semantics 1) defining transitions under PSO. Semantics 1 shows the concrete operational semantics of the PSO model. FIG. 4 shows the role played by the store buffer for storing and loading values to/from main memory (Store, LOAD-G, LOAD—B, FLUSH). The FENCE and CAS rules have memory fence semantics. Those rules are enabled only when the buffer of the executing process is empty. Thus, when a process encounters, e.g., a fence instruction, it cannot continue execution until all of the buffers are flushed. For simplicity, the semantics of instructions are omitted that do not access shared memory (register operations, branches) and leave expression evaluation implicit. That is, L(p)(r) is extended to the evaluation of complex expressions r. However, note that a complex expression may only depend on local variables—expression evaluation may not cause a memory access.

Total Store Order (TSO) Model

The concrete state differs from the PSO concrete state only on the definition of the store buffer. For TSO, there exists only a single, combined, buffer for every thread. That is, $SB=PID \to Seq(Shared \times D)$. The semantics must also be updated to take the difference into account. The flavor of the required changes can be seen in the TSO version of the LOAD—G rule in Semantics 2. FIG. 5 illustrates the operational semantics 500 (Semantics 2) defining LOAD—G rule for concrete TSO. Note that as the difference between PSO and TSO lies in the grouping of shared variables into store buffers, they can be treated as special cases of the same general model.

Partial-Coherence Abstractions

A family of abstract memory models is presented that abstract the concrete semantics discussed above. The following presentation focuses on abstractions of the exemplary SPARC PSO model, but the adaptation to TSO and other models would be apparent to a person of ordinary skill in the art. Generally, the disclosed partial-coherence abstractions vary the precision which records the order between memory operations. The ability to vary the precision is useful as different algorithms can be verified with different levels of precision. When the abstraction is used for fence inference, it can be shown that there exists a trade-off between the precision of the analysis (which affects the state-space size) and the precision of inferred fences.

Partial Coherence in a Store Buffer

Abstract State—As mentioned informally above, a store buffer is represented in a bounded way by losing order information between items past a certain bound. Technically, an abstract state $\alpha \in A$ is a tuple (G, L·pc,l,S, H) where $A=SVar \times Env \times PC \times Last \times Set \times Head$ such that G, L and pc are as defined in the concrete semantics and:

$l \in Last$ where $Last=PID \to (Shared \to D)$ records the latest (most recent) value written to the per-variable buffer of a given process $S \in Set$ where $Set=PID \to (Shared \to 2^D)$ records a set of values such that the order between them is no longer preserved.

$H \in Head$ where $Head=PID \to (Shared \to Seq_{\leq k}(D))$ represents the k oldest values in a buffer (in their original order), if those are known. In other words, for every shared variable x, a concrete buffer B(p)(x) is represented by the abstract tuple $(l_p(x), S_p(x), H_p(x))$. $l_p(x)$ is the most recent value written to .x, $H_p(x)$ preserves the order between the oldest k values in the buffer, and $S_p(x)$ maintains an unordered set of elements written to the buffer past the bound k.

The abstract domain is defined as the powerset domain of A, $2^A$ ordered by inclusion. The abstraction function $\alpha: 2^{C^{\mp}} \to 2^A$ is defined using an extraction function $\beta: C^{\mp} \to A$:

$$\alpha(\sum) = \bigcup_{\sigma \in \Sigma} \beta(\sigma)$$

-continued $$\beta(\sigma) = \langle G_\sigma, L_\sigma, pc_\sigma, \beta_l(B_\sigma), \beta_S(B_\sigma), \beta_H(B_\sigma)\rangle$$

$$\beta_l[B](p)(x) = \begin{cases} \text{last}(B(p)(x)) & \text{if } B(p)(x) \neq \epsilon \\ \bot & \text{otherwise} \end{cases}$$

$$\beta_S[B](p)(x) = \begin{cases} \emptyset & \text{if } |B(p)(x)| \leq k \\ \text{Set}(\text{tail}(B(p)(x), & \text{otherwise} \\ |B(p)(x)| - k)) \end{cases}$$

$$\beta_H[B](p)(x) = \begin{cases} B(p)(x) & \text{if } |B(p)(x)| \leq k \\ \text{head}(B(p)(x), k) & \text{otherwise} \end{cases}$$

The Importance of Recency—The disclosed partial-coherence abstractions use l to record the most recent value stored for a variable. This is motivated by the need to preserve the intra-process coherence requirement that a process storing several values to a shared variable x, and then preforming a load from x, should not see any value it has itself stored except the most recent one. This is a basic property and abstractions that do not preserve this information will fail to verify many reasonable programs.

The Importance of Preserving Order—The disclosed partial-coherence abstractions maintain ordering between the oldest k elements in the store buffer. This is motivated by the need to (partially) preserve the inter-process coherence requirement that a process $p_i$ should not observe values written by process $p_j$ in an order different from the order in which they were written.

It has been observed that in practice, a process only performs a bounded number of writes to a variable before these writes need to be made visible to other processes. An example of this is found below in the discussion of Lamport's fast mutex. This motivated the disclosed abstractions in which ordering is preserved up to some bound k. Other bounded representations of a store buffer are possible, but it has been found that this partial ordering works well in practice.

FIG. 6 illustrates the abstract operational semantics 600 (Semantics 3) defining transitions from (G, L, pc, l, S, H) to (G', L', pc', l', S', H'). Semantics 3 shows the abstract semantics with partial coherence parameterized by k. In FIG. 6, the shorthand $\text{emp}(p)(x) \overset{def}{=} (H(p)(x) = \epsilon \wedge S(p)(x) = \phi)$ is employed.

Loading Values and Recency—In the concrete semantics, a process may load the latest value it wrote by reading its own store buffer. Correspondingly, in the abstract semantics, the rule LOAD—B reads the most recent value recorded in l. If the most recent value l that a process wrote had not been recorded, a process p that performs a load when $S(p)(x) \neq \phi$ would have to conservatively explore all of the possible values that are in the set S(p)(x). The rule LOAD—G is similar to the concrete semantics: when the buffer is known to be empty, the value is loaded from global store.

Storing Values—In the abstract semantics, store is split into two cases STORE—H and STORE—S, based on whether the size of the buffer H(x) has reached the bound k. As long as |H(x)|<k, and $S(x)=\phi$ the contents of the buffer are known precisely. Thus, similarly to the concrete semantics, the effect of a store follows STORE—H, adding the value to the tail of the buffer H(x) and updating the most recent value l(x). When |H(x)|=k, the size of the buffer H has been exceeded and no more values can be stored in H. Therefore, the new value is stored in the (unordered) set of values S(x) (as shown in the rule STORE—S) and the most recent value l(x) is updated accordingly. When $S(x) \neq \phi$ the information on the precise number of elements on the buffer is lost, and thus must keep updating the set.

Flushing Values—In the abstract semantics, flush is split into three cases: FLUSH—H, FLUSH—SN and FLUSH—SD. When $H(x) \neq \epsilon$ then FLUSH—H behaves as the FLUSH rule in the concrete semantics: it selects the oldest element in H(x), writes it to G(x) and updates H(x). However, when $H(x)=\epsilon$ and $S(x)\neq\phi$, any of the values in S(x) become possible candidates for flushing (since S(x) is unordered, which value is the oldest one is not known). The rules FLUSH—SD (flush from set, destructive) and FLUSH—SN (flush from set, non-destructive) then only differ on whether the selected value to the flushed is removed from S(x) or is kept there. This is required since it is not known how many times every value (LOAD-G) appears in the buffer. Thus, in the concrete domain, FLUSH—SD of a value v represents a flush of the last occurrence of v in the buffer. In contrast, FLUSH—SN represents the situation in which more instances of v remain.

The precision of the analysis can be improved by disabling the FLUSH—SD rule, when it is known that the resulting abstract states do not represent any possible concrete states and will only introduce imprecision. In particular, if v=l(x) and S(x) {v}, FLUSH—SD need not fire. If the concrete FLUSH rule is applied to any concretization of this state, the value v will stay in the concrete buffer, while if we flush v from this state using FLUSH—SD, it will remove v from the abstract buffer, leading to abstract states that could not arise in the concrete semantics.

Example

Motivating Recency and Order—Next, an example illustrates why maintaining recency and order is important for verification and inference. Consider a naive set abstraction for the store buffers, and a version of Peterson's algorithm with fences shown in FIG. 1. Under standard concrete semantics of PSO, those fences guarantee that it is impossible for both processes to be concurrently executing line 13. Consider an abstract memory model where order and recency are not maintained, that is, only $S_p(x)$ is maintained without maintaining $l_p(x)$ and $H_p(x)$. Then, it cannot be shown that the algorithm is correct. Consider the following execution:

1. Initially both processes start with empty buffers, and ent0=ent1=turn=0.
2. Process 0 runs through one iteration of the outer loop (executes lines 1-13 inclusively), without performing a flush.
3. Process 0 then tries to enter the critical section again and executes lines 1-3 inclusively. At this stage, $S(p_0)(\text{ent0})$ ={true, false}.
4. Two flush actions are performed on $S(p_0)(\text{ent0})$, first flushing true and then false. At this point G(ent0)=false.
5. Process 0 completes entering the critical section.
6. Process 1 reads ent0 from global store and since ent0 is false, process 1 also enters the critical section.

The above example would not have been possible had if either of the following were kept: i) ordering information via $H_p(\text{ent0})$ for at least two values (i.e. k=2) or ii) recency information via 10(ent0). In the first case, the order of flushing of {true, false} would have preserved the order in which the values were written: it would have first flushed false and then flushed true. In the second case, the fence in line 4 would have forced fully flushing S(po)(ent0), resulting in writing out the most recent value (i.e. G(ent0)=true). While in this case, either $l_p(ent0)$ or $H_p(ent0)$ could have been used with k=2, in other examples both of these refinements with respect to a set are required.

A Partially Disjunctive Abstraction for Store Buffers

The abstraction of the previous section uses a powerset abstract domain where the join operation is set union. It is observed that a more efficient abstraction can be obtained without a significant sacrifice in precision by joining states based on partial equality. The intuition behind this abstraction is that it is desired to combine tuples which differ only in the contents of their unordered set S. The one distinction that should not be preserved regarding the S component is the difference between an empty set and a non-empty set, as many of the rules in Semantics 3 distinguish between these two cases.

It can be said that two tuples $\sigma_1 = \langle G_1, L_1, pc_1, l_1, S_1, H_1 \rangle$ and $\sigma_2 = \langle G_2, L_2, pc_2, l_2, S_2, H_2 \rangle$ match, denoted by $\sigma_1 \approx \sigma_2$, when $G_1 = G_2, L_1 = L_2, pc_1 = pc_2, l_1 = l_2, H_1 = H_2$ and $\forall p, x \cdot (S_1(p)(x) = \phi \Leftrightarrow S_2(p)(x) = \phi)$. An order between tuples $\sigma_1 \sqsubseteq^T \sigma_2$ is defined when $\sigma_1 \approx \sigma_2$ and $\forall p, x \cdot S_1(p)(x) \subseteq S_2(p)(x)$. The join operation is defined as follows:

$$\sigma_1 \sqcup^T \sigma_2 = \begin{cases} \{\langle G_1, L_1, pc_1, l_1, S_1 \cup S_2, H_1 \rangle\} & \sigma_1 \approx \sigma_2; \\ \{\sigma_1, \sigma_2\} & \text{otherwise.} \end{cases}$$

which can be used with the above-described extraction function $\beta$ to yield the new abstraction function $\alpha^T$ as follows:

$$\alpha^T(\Sigma) = \sqcup_{\sigma \in \Sigma}^T \beta(\sigma)$$

Intuitively, this join operation merges matching tuples to their least upper bound, and keeps tuples that do not match as separate elements in a powerset abstraction.

The new join operation also implies a change to the abstract transformer. In the fully disjunctive abstraction, flushes from S were split into two cases: FLUSH—SD to represent flushing the last instance of a value from the buffer, and FLUSH—SN to represent an instance that is not the last one. The case split for the partially disjunctive abstraction is slightly different. The new flush semantics are shown in Sem. 4 (FIG. 7). FIG. 7 illustrates the partially disjunctive flush semantics 700 (Semantics 4). As shown in FIG. 7, the rule FLUSH—NE covers the case in which a flush leaves S non-empty, while FLUSH—E represents flushing the only remaining element of the concretization of the abstract buffer. Note that it's possible for both types of flush rules to be enabled in the same state.

Recoverability of Sequential Consistency

Consider a program P that satisfies its specification S under the sequentially consistent memory model, P|=sc S, but violates it under a weaker memory model M, P≠m S. It can be said that M is SC-Recoverable (SCR) when for any such P there exists a program P' obtained from P by adding fences such that P'|=m S. For SC-Recoverable memory models, when P|=sc S the trivial solution in which fences are added after every memory operation in P always exists. This property might seem trivial, however, it is easy to design seemingly reasonable abstract models for which it does not hold. For instance, as demonstrated below, a partial-coherence abstraction with recency and k=0 does not in fact satisfy this property.

Once k≥1 the SCR property holds. If a fence is placed immediately after every store instruction, then i) |H| can never grow above 1, so stores cannot become visible out of order and ii) the store can not be observed by the process itself before it is flushed. In effect this makes the store and flush operations atomic, reducing the model's behavior to sequential consistency.

Fence Inference

As indicated above, a new technique is presented for inferring memory fences under store-buffer based abstract memory models. Generally, existing approaches for fence inference focus squarely on finite state programs and as such are not applicable in the present setting.

For the disclosed algorithm, the general recipe for removing transitions is followed as outlined in E. Clarke and E. Emerson, "Design and Synthesis of Synchronization Skeletons Using Branching-Time Temporal Logic," Logic of Programs, Workshop 52-71 (1982): (i) Construct (a possibly abstract) transition system and find the reachable error states. (ii) Construct a boolean formula that describes how traces leading to those error states can be avoided. (iii) Implement satisfying assignments of the formula using syntactic constructs.

A challenge in implementing this general recipe is in defining which transitions may be avoided, and how the possible ways to avoid a transition can be deduced from the transition system. Next, the definitions are presented that are appropriate for each semantic: concrete, fully-disjunctive and partially-disjunctive. An example is also presented demonstrating the interplay between the precision of the abstraction and the quality of inferred fences.

Inference Under Concrete Semantics

Buffers of Labeled Stores—The semantics given above in the section entitled "Operational Semantics for RMMs," do not preserve enough information about program execution to enable fence inference. Using those semantics, it is not possible to determine that a given memory operation was delayed by examining only the source state and the transition associated with the operation. Therefore, the concrete semantics must be instrumented with additional information about the statement that stored each value. To achieve this, for a process p and variable x, the store buffer $B(p)(x) \in Seq(Labs \times D)$ is extended to be a sequence of pairs (1, v). That is, for every value stored, the label of the program statement that stored the value is also recorded.

Avoiding Error States—Every transition t that is not a flush is associated with a statement in the code. l denotes the label of this instruction. Informally, a transition t from state $\sigma$ is avoidable if there exists some constraint that can be enforced on the program to prevent the transition from being executed. In the present context, the type of constraint that can be enforced (by using fence instructions) is the order between flush and non-flush transitions. That is, if an instruction at $l_v$ stores the value v to the buffer, v can be forced to be flushed before the execution of some subsequent instruction at label $l_r$. These ordering constraints are represented as $[l_v \prec l_r]$ with the intended meaning that if the constraint is enforced, a value written by a store at $l_v$ must be flushed before the execution of the instruction at $l_r$.

As a first stage in the inference algorithm, the program's transition system $(\Sigma, T)$ is constructed where $\Sigma$ is the set of reachable program states and T the set of transitions. Every state $\sigma \in \Sigma$ is labeled with a propositional formula that captures how state $\sigma$ can be made unreachable (avoided) through the use of ordering constraints. Intuitively, a state a can be avoided by avoiding all incoming transitions to $\sigma$ in the program's transition system. In turn, a single transition $\mu \to \sigma$ can be avoided by either avoiding its source state $\mu$ or by prohibiting the transition itself.

A formula prevent(t) is associated with each transition t∈T:

$$\text{prevent}(t) = V\{[l \prec l_t] | \exists x, v \cdot \langle l, v \rangle \in \text{Set}(B_{src(t)}(\text{proc}(t)(l)))\}$$

Here, proc(t) is used to denote the process that executes the transition t and src(t) to denote the source state of the transition. This formula captures all possible ordering constraints that would prohibit execution of t. Formally, it is a disjunction because it is enough to enforce one of the constraints to make t unreachable.

To compute how a state σ∈Σ can be avoided, a labeling function L is defined and:

$$\text{avoid}(L,\sigma) = \wedge (L(\mu) \vee \text{prevent}(t)) | t = (\mu \rightarrow \sigma) \in T)$$

A transformer is also defined that updates the labeling function:

$$\text{infer}(L) = L[\sigma \mapsto (L(\sigma) \wedge \text{avoid}(L,\sigma))]$$

Given an initial mapping $L_0$ that maps all unavoidable states to false and the rest to true, the greatest fixed point of $\text{infer}(L_o)$ describes all the possible ways in which any state σ can be avoided. The greatest fixed point is computed with respect to implication partial order $L_1$ [$L_2 = \forall \sigma \in \Sigma \cdot L_1(\sigma) \Rightarrow L_2(\sigma)$. Using the provided specification, a set $E \subseteq \Sigma$ of reachable error states is identified. The overall constraint formula ψ is computed by taking the conjunction of avoid constraints for all error states $\psi = \wedge \{L(\sigma) | \sigma \in E\}$. A satisfying assignment to this formula is guaranteed to represent a correct fence placement.

Inference Under Abstract Semantics

The abstract model can be extended in the same way the concrete model was extended. That is, H(p)(x) and S(p)(x) will contain, ⟨label,value⟩ pairs.

Inference Under Disjunctive Abstraction

Using the abstract semantics of the section entitled "Partial Coherence in a Store Buffer," an abstract transition system can be constructed for the program, and the same reasoning can be applied as in the concrete semantics, except that prevent(t) is adjusted:

$$Q_\sigma(p)(x) = S_\sigma(p)(x) \cup \text{Set}(H_\sigma(p)(x))$$

$$\text{prevent}(t) = V\{[l \prec l_t] | \exists x, v \cdot \langle l, v \rangle \in Q_{src(t)}(\text{proc}(t)(x))\}$$

This adjustment is safe because if ⟨$l_v$,v⟩ ∈Q(p)(x), then for any concretization $\sigma^h$ of σ, $B_{\sigma^h}(p)(x)$, must contain ⟨$l_v$,v⟩ at least once. Thus, placing a fence between any such $l_v$ and $l_t$ is sufficient to avoid t from $\sigma^h$.

While safety is preserved under abstraction, optimality is not. It is possible to infer more fences than necessary due to the imprecision of the abstraction. FIG. 8 illustrates an exemplary fully disjunctive partial-coherence abstraction with k=0 leads to a redundant fence between the stores in Process 1, while with k=1 the inference algorithm determines that no fences are necessary. Consider the simple example in FIG. 8, with the specification that in a final state r1≤r2. If it is attempted to run this program under partial-coherence semantics with k=0, a trace may be obtained where in the final state, r1=2,r2=1: a) Process 1 performs both stores. b) Process 1 flushes the value 2. c) Process 2 performs the load at line 1. d) Process 1 flushes the value I. e) Process 2 performs the load at line 2. The single avoidable transition in this trace is the execution of the second store by process 1. The only way to avoid this transition is by placing a fence between the two stores. However, if the precision of the abstraction is increased and k=1 is used, this (spurious) trace will not be produced and the redundant fence will not be inferred.

Inference Under Partially Disjunctive Abstraction

For the abstract semantics of the section entitled "A Partially Disjunctive Abstraction for Store Buffers," prevent(t) needs to be adjusted:

$$\text{prevent}(t) = \wedge \{[l \prec l_t] | \exists_{x,v} \cdot \langle l, v \rangle \in Q_{src(t)}(\text{proc}(t)(x))\}$$

The only change from the fully disjunctive abstraction is in replacing ∨ with ∧. The reason for this change becomes clear once the concretization function is examined for the partially disjunctive abstraction. Given an abstract state σ and a non-empty $S_\sigma(p)(x)$, there exist concretized states which do not contain all values in $S_\sigma(p)(x)$. Since prohibiting a transition from σ requires prohibiting that transition from all concrete states in $\gamma^T(\{\sigma\})$, prevent(t) must be a conjunction over the possible prevent formulas in the concrete domain. For many transitions, this formula will be stronger than the optimal one, potentially leading to a fence placement worse than the one produced by the fully disjunctive abstraction with the same k value.

Fine-Grained Fence Inference

The inference algorithm described above generates sets of constraints that must be enforced so that the specification is satisfied. One simple way to enforce a constraint [$l_1 \prec l_2$] is by placing a full fence on every path between $l_1$ and $l_2$ on the control-flow graph of the program. If finer-grained fences are available on the architecture, information encoded in the constraint can be used to implement it more efficiently. For example if the architecture provides separate store-store and store-load fences, the appropriate fence can be placed based on whether the instruction at $l_2$ is a store or a load. If the architecture provides fences that enforce flushing only one variable (e.g. CAS in our concrete PSO semantics), then the correct fence type can be placed based on the variable written to by $l_1$. For simplicity, in the following section, it is assumed the only fence available is a full fence. However, whenever an inference succeeds, finer-grained fences can be placed.

Exemplary Implementation

The disclosed abstractions have been implemented together with the verification and inference algorithms. An inherent trade-off is discussed between the optimality of fence inference and the state-space size dictated by the abstraction.

An exemplary embodiment can be implemented in Java and use the JavaBDD library to represent avoid formulae as BDDs.

Exemplary Abstractions—In an exemplary embodiment, a range of abstract memory models are considered, all of which are abstractions of the concrete PSO memory model:
  Set: an abstraction of the store buffer to a set, without any additional information, such as recency.
  FD: the partial coherence abstraction shown in FIG. 3, with varying k
  PD: the partially disjunctive abstraction described in the section entitled "A Partially Disjunctive Abstraction for Store Buffers." Note that the Set abstraction and FD/PD with k=0 are generally not SC-Recoverable. Thus, it is possible that during fence inference, the exemplary embodiment will report the program as impossible to fix.
Benchmarks To evaluate the exemplary embodiment, various classic concurrent algorithms are selected such as well-known mutual exclusion algorithms (mutex) and synchronization barrier algorithms. All algorithms were exercised in a loop by two concurrent processes ("repeated entry"):

Dekker's Algorithm (See, E. Dijkstra, "Cooperating Sequential Processes," TR EWD-123. Tech. rep., Technological University, Eindhoven, 1965). To evaluate both inference and verification we used two versions:
   Dek0: has no added fences and is incorrect under the PSO memory model.
   Dek2: has two added fences and is known to be correct.
Peterson's Algorithm (G. L. Peterson, "Myths About the Mutual Exclusion Problem," *Inf Process. Lett.* 12, 3, 115-16 (1981)), using two versions, Pet0 and Pet2.
A variation of Lamport's Bakery (L. Lamport, "A New Solution of Dijkstra's Concurrent Programming Problem," *Commun. ACM* 17, 8, 45-55 (1974)) using two versions, Lam0 and Lam2. To make this algorithm finite-space the maximum ticket number was manually bounded at 2.
Lamport's Fast Mutex (L. Lamport, "A Fast Mutual Exclusion Algorithm," *ACM Trans. Comput. Syst.* 5, 1, 1-11 (1987)) using two versions, Fast0 and Fast3.
CLH Queue Lock (P. S. Magnusson, "Queue Locks on Cache Coherent Multiprocessors," *IEEE Proc. of the Int. Svmnp. on Parallel Processing*, 165-71 (1994)) using two versions, CLH0 and CLH2;
MCS Queue Lock (J. M. Mellor-Crummey et al., "Algorithms for Scalable Synchronization on Shared-Memory Multiprocessors," *ACM Trans. Comput. Syst.* 9, 1, 21-65 (1991)). Here, only a version with no fences (MCS0) was used.
Centralized Sense-Reversing Synchronization Barrier (D. Hensgen et al., "Two Algorithms for Barrier Synchronization," *Int. J. Parallel Program.* 17, 1, 1-17 (1988)) using two versions Sense0 and Sense1.

For the mutual exclusion, the specification is that there cannot be more than one process inside the critical section. "Release semantics" for memory operations within the critical section are not enforced.

The benchmarks were selected based on two criteria:

Novelty—The benchmarks could not be handled by any of the previous approaches. For instance, as mutual exclusion algorithms inherently contain benign data races, using techniques like delay set analysis would result in a gross overestimation of the required number of fences. Furthermore, some of the benchmarks—for instance Dek and Fast contain benign triangular data races (as defined in S. Owens, "Reasoning About the Implementation of Concurrency Abstractions on x86-TSO," *ECOOP* (2010)). Thus, even if we focus squarely on the TSO memory model, we could not use the results of S. Owens, referenced above, to establish the correctness of the algorithms by focusing only on sequentially consistent executions. Finally, all of the benchmarks contain unbounded spin-loops, and as such, they cannot be handled directly using bounded techniques.

Simplicity—It is desired to abstract the effect of the relaxed memory model in isolation from other sources of unboundedness. Hence, algorithms are selected to be finite-state when executed under the SC model.

Verification

FIG. 9 is a sample table 900 illustrating verification results and number of states (in thousands) produced by an exemplary embodiment with various abstractions. The employed programs were known to be correct under the concrete PSO semantics, that is, appropriate fences have been placed in advance. All verification runs completed within 30 seconds. Each entry in the table contains the total number of states explored (in thousands). A check mark is placed if verification succeeded, and an "X" mark is placed if a spurious (abstract) counter-example was found. In some of the runs of CLH2, the exemplary embodiment exhausted the available memory, and thus the state-space size is not reported. However, in all those cases an (abstract) counter-example was found before the exemplary embodiment ran out of memory.

As shown by FIG. 9, none of the correct examples could be verified using the naive set abstraction, however, all of them could be verified using FD with k=1. Since verification of all examples successfully completed with FD, there was no need to use the PD abstraction.

The table also shows $FD_{k=O}$ generated spurious counter-examples for CLH2 and Fast3 but not the other algorithms. When k=0, the partial-coherence abstraction ($FD_{k=O}$) reduces to the set abstraction with recency information. This is enough to verify the simpler algorithms, however, it fails on the more complex ones.

The example of Lamport's fast mutex is particularly interesting, as it demonstrates the type of executions possible with non SC-recoverable abstractions. FIG. 10 illustrates exemplary pseudo code 1000 for a version of Lamport's fast mutex algorithm for two processors. The code given is for process i. In the implementation of FIG. 10, a process can enter the critical section either along the fast path (the if in line 15 succeeds) or along the slow path (if the if fails). Under an abstract model with k=0, the following execution is possible:
   Process 1 enters the critical section along the fast path, executes it, and runs until line 29.
   Process 1 executes line 29. At this point $Si(y)=\{0\}$.
   Process 1 flushes p non-destructively, using the FLUSH—SN rule. Now G(y)=0.
   Process 2 enters the critical section. Since G(y)=0 it enters along the fast-path setting p=2 in the process. This is flushed using the FLUSH—SD rule. At this point, $G(y)=2, S_1(y)=\{0\}, S_2(y)=\phi$.
   Process 1 resumes. It first performs a flush of y, setting G(y)=0. Then, the process proceeds to enter the critical section again, using the fast path.

This execution relies on the fact $p_1$ only stored the value 0 to y once, but this store is flushed twice. In effect, $p_2$ observed this store as if it happened before its own, and $p_1$ observed it as if it happened after the store of $p_2$. This coherence violation would have been prevented if more information was kept in the content of the buffer, by using k>0. Indeed, with k=1, Fast3 passes verification.

Inference

FIG. 11 is a sample table 1100 illustrating the state-space size and inference results for five of the under-fenced implementations. A bold check mark means the optimal fences were inferred, a check mark means that state-space generation converged but the result was different from the optimal fences, and an "X" mark means that the exemplary embodiment ran out of memory.

Initially, the exemplary embodiment was used to perform fence inference with abstractions $FD_{k=o}$ and $FD_{k=1}$. However, the exemplary embodiment ran out of memory for Lam0, Fast0, and Fast1c. Using the partially disjunctive abstraction $PD_{k=o}$ enabled us to run the inference algorithm for both Lam0 and Fast1c and obtain a sound fence placement for both. Furthermore, despite the loss of precision in the PD abstraction, in both cases the inferred fences are not trivial, and do not enforce SC.

Peterson's Algorithm—As the state-spaces for Peterson's algorithm are small, it can be used to demonstrate the inherent trade-offs between inference optimality and abstraction precision:

With the FD abstraction, the exemplary embodiment was able to infer the optimal fence placement with k=0. With the PD abstraction it required k=2 and a much larger state-space.

With the $PD_{k=o}$ abstraction, a smaller state space can be produced, but the result is suboptimal: 3 fences are required instead of 2. In addition to the two fences shown in FIG. 1, another fence, immediately after the store in line 14, is inferred.

The same trade-off can also be observed when using a similar partial-coherence abstraction of the TSO model. For k=0 and k=1 suboptimal fence placement is generated, while with k=2 the result is optimal (for TSO).

Lamport's Fast Mutex—For both Fast0 and Sense0, a loss of precision was experienced when using a k value that is too small. In the case of Fast0, the inference algorithm reported the program as unfixable when using $PD_{k=o}$. This is due to the fact the counter-example presented for Fast3 under this abstract model cannot, in fact, be fixed with any number of fences. Unfortunately, the exemplary embodiment was unable to build the state-space of Fast0 under $PD_{k=1}$. Thus, a complementary set of experiments was conducted in which 1 of the 3 required fences was placed. The 3 versions of Lamport's fast mutex (FIG. 10) had a single fence inserted: (i) between lines 5 and 6 (Fast1a), (ii) between lines 13 and 14 (Fast1b), (iii) between lines 29 and 30 (Fast1c). As expected, for all 3 programs, when running under $PD_{k=o}$ the program was unfixable. However, in all 3 cases, a correct fence placement was inferred using $PD_{k=1}$. Furthermore, for Fast1a and Fast1b, the optimal placement of the two other fences was found when using $PD_{k=2}$. For Fast1c even with k=2, the placement was still suboptimal. This demonstrates another example of the interplay between the placed fences and the precision of the required abstraction. Even though for Fast1c he optimal fence placement could not be inferred using $PD_{k=1}$, had they been placed manually, this abstraction could be used to verify them.

An approach is disclosed for automatic verification and fence-inference for concurrent programs running under relaxed memory models. The disclosed approach is based on abstract interpretation, and its technical core is a family of partial-coherence abstractions that provide a (parametric) bounded representation for potentially unbounded store buffers. The disclosed abstractions enable automatic verification of concurrent algorithms without worrying about the size of the underlying store buffers. Because partial coherence abstractions are designed to be SC-Recoverable, they can be used for automatic inference of memory fences. The disclosed abstractions can be combined with heap abstractions to enable verification of heap-manipulating programs under RMMs.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
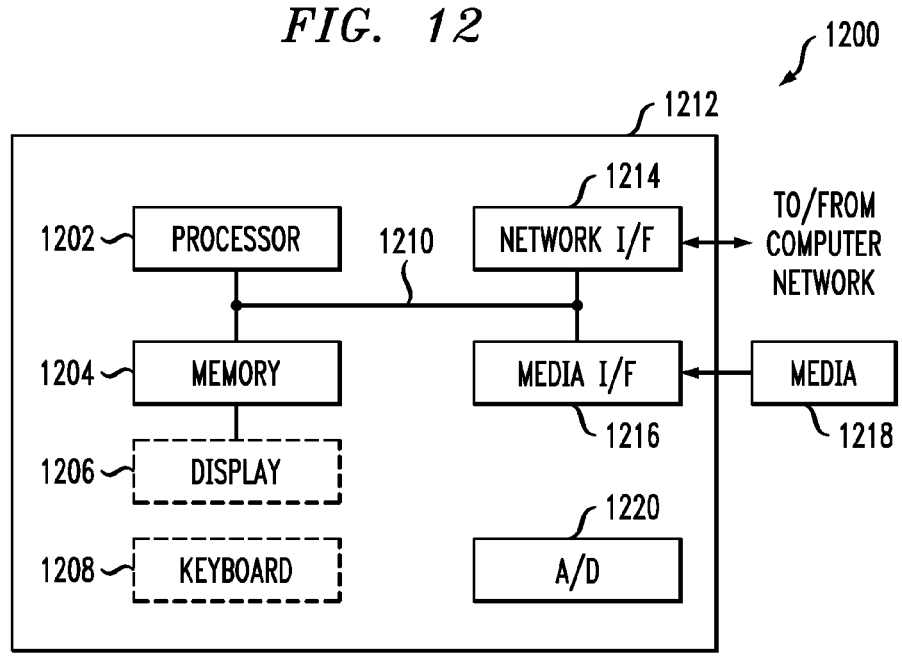
FIG. 12 depicts a computer system that may be useful in implementing one or more aspects of the present invention.

One or more embodiments can make use of software running on a general purpose computer or workstation. FIG. 12 depicts a computer system 1200 that may be useful in implementing one or more aspects and/or elements of the present invention. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Analog-to-digital converter(s) 1220 may be provided to receive analog input, such as analog video feed, and to digitize same. Such converter(s) may be interconnected with system bus 1210.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1202. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining whether a program satisfies a safety specification, wherein said program employs a relaxed memory model, said method comprising:
    obtaining an abstract memory model of said relaxed memory model, wherein said abstract memory model represents concrete program states of said program as a finite number of abstract states, wherein said relaxed memory model uses one or more store buffers and wherein said one or more store buffers are represented in said abstract memory model in a bounded way by maintaining order information between elements in a corresponding store buffer only up to a predefined bound and by handling elements in said corresponding store buffer beyond said predefined bound as an unordered set, wherein said abstract memory model preserves intra-process coherence by maintaining recency information per variable, wherein said recency information comprises an indication of how recently the respective variable was stored;
    determining one or more fence positions at one or more locations to ensure said safety specification is satisfied, wherein said one or more fence locations ensure that if a process $p_i$ performs a fence when its buffer for variable x is non-empty, a value of x visible to one or more additional processes immediately after the fence location, is a most recent value written by said process $p_i$; and
    evaluating said safety specification for said program on said abstract memory model having said finite number of abstract states.

2. The method of claim 1, wherein a most recently stored value is recorded for said one or more store buffers, such that when several values are stored to a shared variable, and then a load from said shared variable is performed, only a most recent value that was stored is obtained.

3. The method of claim 1, further comprising a step of maintaining an order between k oldest elements in a given store buffer, such that a first process $p_i$ should not observe values written by a second process $p_j$ in an order different from the order in which they were written by said second process $p_j$.

4. The method of claim 1, wherein said one or more store buffers model a reordering of memory operations with respect to each other.

5. The method of claim 1, wherein said one or more store buffers model executing one or more store operations non-atomically across a plurality of processors.

6. The method of claim 1, wherein said abstract memory model at least partially preserves information required for memory coherence and consistency.

7. The method of claim 1, wherein said abstract memory model preserves inter-process coherence by preserving an order between write operations up to said predefined bound and handling write operations beyond said predefined bound as an unordered set.

8. The method of claim 7, wherein said predefined bound may be programmed by a user.

9. A system for determining whether a program satisfies a safety specification, wherein said program employs a relaxed memory model, said system comprising:
    a memory; and
    at least one processor, coupled to the memory, operative to:
    obtain an abstract memory model of said relaxed memory model, wherein said abstract memory model represents concrete program states of said program as a finite number of abstract states, wherein said relaxed memory model uses one or more store buffers and wherein said one or more store buffers are represented in said abstract memory model in a bounded way by maintaining order information between elements in a corresponding store buffer up to a predefined bound and by handling elements in said corresponding store buffer beyond said predefined bound as an unordered set, wherein said abstract memory model preserves intra-process coherence by maintaining recency information per variable, wherein said recency information comprises an indication of how recently the respective variable was stored;
    determining one or more fence positions at one or more locations to ensure said safety specification is satisfied, wherein said one or more fence locations ensure that if a process $p_i$ performs a fence when its buffer for variable x is non-empty, a value of x visible to one or more additional processes immediately after the fence location, is a most recent value written by said process $p_i$; and
    evaluate said safety specification for said program on said abstract memory model having said finite number of abstract states.

10. The method of claim 9, wherein a most recently stored value is recorded for said one or more store buffers, such that when several values are stored to a shared variable, and then a load from said shared variable is performed, only a most recent value that was stored is obtained.

11. The method of claim 9, wherein said processor is further configured to maintain an order between k oldest elements in a given store buffer, such that a first process $p_i$ should not observe values written by a second process $p_j$ in an order different from the order in which they were written by said second process $p_j$.

12. The method of claim 9, wherein said one or more store buffers model a reordering of memory operations with respect to each other.

13. The method of claim 9, wherein said one or more store buffers model executing one or more store operations non-atomically across a plurality of processors.

14. The system of claim 9, wherein said abstract memory model at least partially preserves information required for memory coherence and consistency.

15. The system of claim 9, wherein said abstract memory model preserves inter-process coherence by preserving an order between write operations up to said predefined bound and handling write operations beyond said predefined bound as an unordered set.

16. The system of claim 15, wherein said predefined bound may be programmed by a user.

17. An article of manufacture for determining whether a program satisfies a safety specification, wherein said program employs a relaxed memory model, said article of manufacture comprising a non-transitory machine readable recordable medium containing one or more programs which when executed implement the steps of:

obtaining an abstract memory model of said relaxed memory model, wherein said abstract memory model represents concrete program states of said program as a finite number of abstract states, wherein said relaxed memory model uses one or more store buffers and wherein said one or more store buffers are represented in said abstract memory model in a bounded way by maintaining order information between elements in a corresponding store buffer up to a predefined bound and by handling elements in said corresponding store buffer beyond said predefined bound as an unordered set, wherein said abstract memory model preserves intra-process coherence by maintaining recency information per variable, wherein said recency information comprises an indication of how recently the respective variable was stored;

determining one or more fence positions at one or more locations to ensure said safety specification is satisfied, wherein said one or more fence locations ensure that if a process $p_i$ performs a fence when its buffer for variable x is non-empty, a value of x visible to one or more additional processes immediately after the fence location, is a most recent value written by said process $p_i$; and evaluating said safety specification for said program on said abstract memory model having said finite number of abstract states.

* * * * *